United States Patent

Thor et al.

[11] 3,999,921
[45] Dec. 28, 1976

[54] TWO-CHANNEL EXTRUDER WITH MIXER

[75] Inventors: Gunter Thor, Krefeld-Traar; Friedhelm Finkensiep, Krefeld-Uerdingen; Werner Schneider, Krefeld, all of Germany

[73] Assignee: Henkel & Cie G.m.b.H., Dusseldorf-Holthausen, Germany

[22] Filed: Apr. 18, 1975

[21] Appl. No.: 569,537

[30] Foreign Application Priority Data

Apr. 25, 1974 Germany .......................... 2419952

[52] U.S. Cl. .......................... 425/208; 241/260.1; 259/105; 259/191; 425/378 R
[51] Int. Cl.² .......................... B29F 3/06
[58] Field of Search ........ 425/131.1, 133.1, 133.5, 425/204, 207–209, 378, 462, 309, 313; 259/6, 105, 191; 222/139; 241/260.1

[56] References Cited

UNITED STATES PATENTS

| 2,257,067 | 9/1941 | Parsons | 425/197 |
| 2,653,351 | 9/1953 | Henning | 425/204 |
| 2,764,780 | 10/1956 | Reifenhauser | 425/131.1 |
| 2,769,201 | 11/1956 | Lorenian | 425/133.1 |
| 3,314,108 | 4/1967 | Wienand et al. | 425/133.1 |
| 3,689,182 | 9/1972 | Kovacs | 259/105 |
| 3,712,594 | 1/1973 | Schippers et al. | 259/191 |
| 3,801,248 | 4/1974 | Fisher | 425/309 |
| 3,870,451 | 3/1975 | Gokcen | 425/378 |

FOREIGN PATENTS OR APPLICATIONS

| 62,025 | 2/1944 | Denmark | 425/209 |

Primary Examiner—Francis S. Husar
Assistant Examiner—John McQuade
Attorney, Agent, or Firm—Hammond & Littell

[57] ABSTRACT

This invention relates to an improvement in an extruder with two press screws arranged coaxially in one another in an outer jacket and each carrying a screw thread for feeding various plastic materials, for example, granulated soap, to the press nozzle, where the outer screw is driven while the inner screw is stationary, and where the inner screw is in communication with the charging material in the area of the charging hopper through window-type openings in the outer screw. The said improvement involves a mixing element between the end of the press screws and the extrusion nozzle whereby the two strands being extruded are mixed.

3 Claims, 2 Drawing Figures

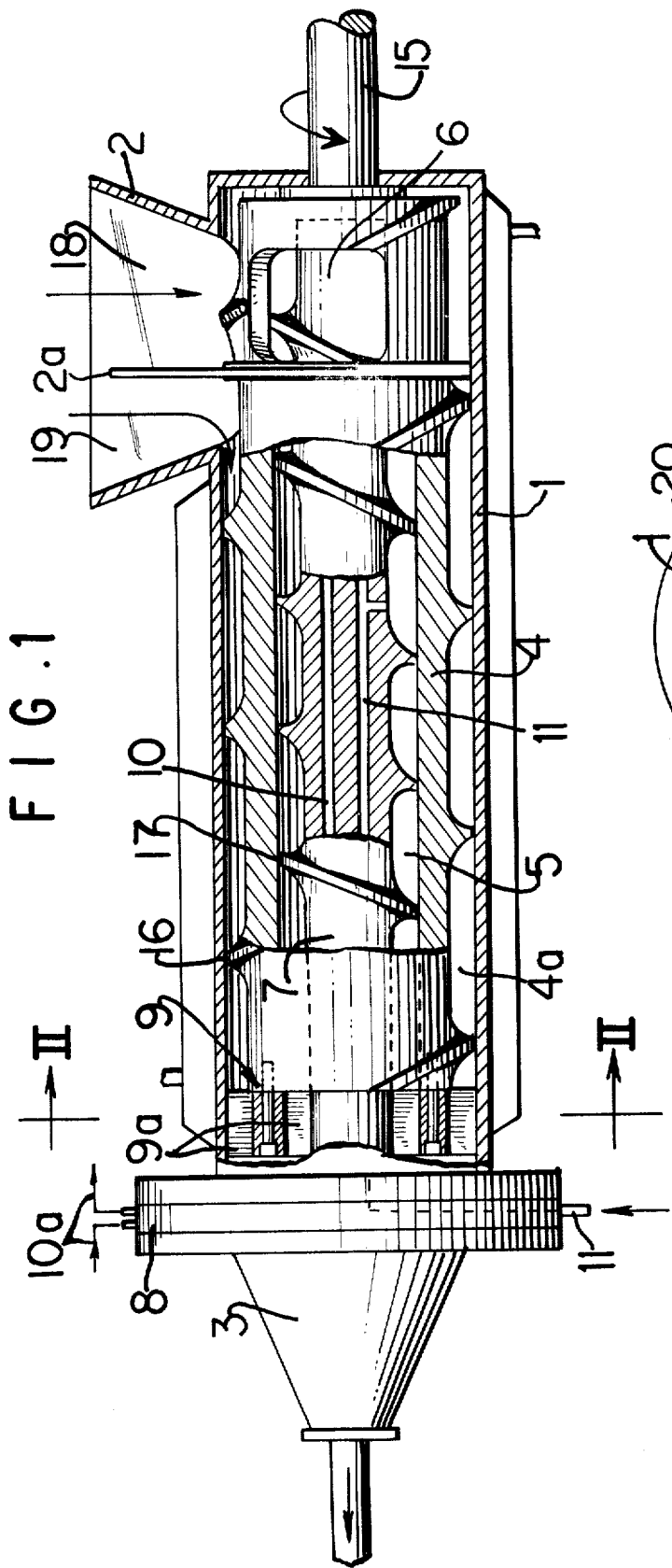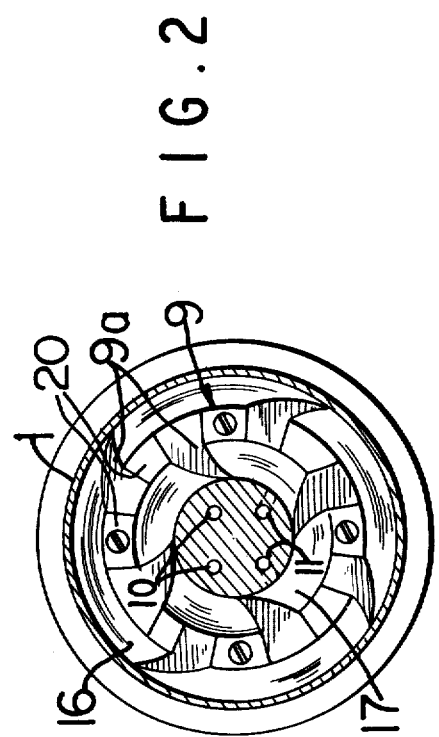

TWO-CHANNEL EXTRUDER WITH MIXER

THE PRIOR ART

Extruders with two press screws arranged coaxially in one another in an outer jacket and each carrying a screw with a male thread for feeding different plastic materials to the nozzle of the extruder, where the outer screw can be driven while the inner screw is stationary, and where the inner screw is in communication with the charging material in the area of the charging hopper through windowtype openings in the outer screw are known principally from Austrian Pat. No. 198,501. These known extruders are suitable for combining two material currents fed through separate charging hoppers at the mouth of the press. An essential object of this design is to avoid the undesired back flow of the material between the inner wall of the outer screw and the outer wall of the outer jacket of the inner screw, which leads to troubles. This problem is solved there substantially in that the outer screw is also provided with an inner thread, which is likewise in communication with the charging material in the charging range through openings in the body of the outer screw and which brings the material to the nozzle of the press, like the male thread of the outer screw.

With this design of the extruder it is possible to extrude a two-colored strand, the more or less thick cover consisting of the material conveyed by the outer screw, while the core of the strand is formed of the material conveyed by the inner screw. This known design cannot, therefore, be used in those cases where a two-colored strand with a marbled structure is to be produced from which soap bars are to be stamped, for example, because the marbling must extend through the entire strand uniformly, and no large single-colored cells should be present.

OBJECTS OF THE INVENTION

An object of the present invention, therefore, was to improve the known extruders so that a strand with a marbled structure distributed uniformly over its entire cross section can be produced, which can then be processed to homogeneously marbled soap bars.

Another object of the present invention is the development in an extruder provided with a hopper at one end and a restricted nozzle at the opposite end and two press screws arranged coaxially in one another within an outer jacket, each of said screws being provided with a male thread for feeding in the direction of said nozzle, said male threads extending into an outer annular space between said jacket and the outer press screw and extending into an inner annular space between said two press screws, means to rotate the outer of said two press screws and means to maintain the inner of said two press screws stationary, said outer press screw being provided with window-like openings communicating with said inner press screw in the area of said hopper and separate feed means in said hopper to separately feed to the area between said outer jacket and said outer press screw and to the area between said outer press screw and said inner press screw through said window-like openings, the improvement consisting in that said threads are oppositely oriented and a mixing element is positioned between said nozzle and said press screws, said mixing element being an annular ring mounted on said rotating outer press screw and having blade-type mixing tools extending into said outer annular space and blade-type mixing tools extending into said inner annular space and having communications between said mixing tools extending from said inner annular space to said outer annular space.

These and other objects of the invention will become more apparent as the description thereof proceeds.

THE DRAWINGS

FIG. 1 is a longitudinal cross-section through the extruder, partially broken away.

FIG. 2 is a cross-section in the direction II—II of FIG. 1.

DESCRIPTION OF THE INVENTION

The drawbacks of the prior art were overcome and the above objects were achieved in an extruder of the above-mentioned type, in that the screw threads of the outer and inner screws are oppositely oriented, and that a mixing element with blade-type mixing tools is secured at the nozzle end of the outer screw which extend into both the conveyer space of the outer and of the inner screw.

The opposite orientation of the screw threads of the outer and inner screw ensures a trouble-free conveyance of the two differently colored material currents through the screw. The conveyance of the outer screw is effected by its rotation by means of a corresponding drive. In the inner screw, on the other hand, which is stationary, the flow of the material is effected by the inner wall of the hollow-cylindrical outer screw.

The invention, more particularly resides in an extruder provided with a hopper at one end and a restricted nozzle at the opposite end and two press screws arranged coaxially in one another within an outer jacket, each of said screws being provided with a male thread for feeding in the direction of said nozzle, said male threads extending into an outer annular space between said jacket and the outer press screw and extending into an inner annular space between said two press screws, means to rotate the outer of said two press screws and means to maintain the inner of said two press screws stationary, said outer press screw being provided with window-like openings communicating with said inner press screw in the area of said hopper and separate feed means in said hopper to separately feed to the area between said outer jacket and said outer press screw and to the area between said outer press screw and said inner press screw through said window-like openings, the improvement consisting in that said threads are oppositely oriented and a mixing element is positioned between said nozzle and said press screws, said mixing element being an annular ring mounted on said rotating outer press screw and having blade-type mixing tools extending into said outer annular space and blade-type mixing tools extending into said inner annular space with spaces or openings therebetween said mixing tools extending from said inner annular space to said outer annular space.

A further improvement of the prior art extruder resides in that the inner screw has bores or channels both for a coolant and for liquid additives to be introduced, the latter channels being in communication with the space between their screw threads.

A coolant, for example, cooling water can thus be conducted through the bores in the inner screw so that heat caused by friction can be eliminated from the extruder. Furthermore bores are provided in the inner screw through which liquid additives, as a rule dyes, can be introduced into the material conveyed by the inner screw. To this end these bores are in communication with the space between their screw threads. It is advisable that the bores for the liquid additives open into the conveyer space substantially in the central range of the inner screw.

The arrangement of a mixing element at the nozzle end of the outer screw results in a certain mixing of the two product currents. This is done in that blade-type mixing tools secured on the mixing element extend both into the conveyer space of the outer screw and that of the inner screw. The number of mixing tools depends on the desired degree of mixing. In order to obtain a pronounced marble structure, it is advisable to provide about 6 to 10 mixing tools, preferably alternating in different directions with spaces therebetween. The rotating mixing tools convey particles from the material current conveyed by the inner screw to the material current conveyed by the outer screw, and deflect inversely particles from the inside to the outside. This prevents the formation of cells without marbled structure.

The extruder according to the invention is represented in the figures of the Drawing by way of example.

The extruder (FIG. 1) consists of two screws 4, 7 arranged coaxially in one another in an outer jacket 1 and carrying each a male screw thread for feeding different plastic materials to the nozzle 3. The outer screw 4 can be driven through drive shaft 15 by means of a drive (not shown). The inner screw 7 is stationary. Window-type opening 6 in the outer screw 4 is provided in the area of the charging hopper 2 which establish a connection of the inner screw 7 with the charging material.

The threads 16 of the outer screw 4 are oppositely oriented relative to the threads 17 of the inner screw 7. The inner screw 7 also has bores or channels 10 for the introduction of a coolant. Furthermore, bore or bores 11 are provided in the screw 7 for the introduction of liquid additives into the space between the threads 17 of the inner screw 7.

Finally the mixing element 9 is arranged at the nozzle end of the outer screw 4 (FIG. 2). The mixing element 9 has eight blade-type mixing elements 9a. The mixing tools 9a cover alternately both the conveyer space 4 and the conveyor space 5 of the inner screw 7. Between each of the blade-type mixing elements 9a are spaces or openings 20. The extruder works as follows:

The stationary outer jacket 1 which is heatable and coolable has a charging hopper 2 at the rear end, which is divided by a partition 2a into two chambers, one 18 feeding into conveyor space 4a and the other 19 feeding into conveyor space 5, and a nozzle 3 on the head of the outer jacket 1. Within the outer jacket 1 rotates the outer screw 4, which is set in rotation over an outer drive shaft 15. The screw 4 is provided with screw threads 16, with an axial inner cylindrical space 5 and with window-type openings 6. The space 5 is in communication through the openings 6 with chamber 19 of charging hopper 2. In the space 5 is also arranged the screw 7 with oppositely directed threads 17. The screw 7 does not rotate, but is frictionally connected over the supporting grate 8 which is clamped between the nozzle 3 and the outer jacket 1. The supporting grate 8 is provided with inlet and outlet pipes 10a in connection with the bores 10 within screw 7 and an inlet pipe 11a in connection with bore 11. The product can flow over the charging hopper 2, on the one hand, to the male thread 16 of the rotating screw 4 and, on the other hand, over the openings 6 into the space 5, and thus to the screw 7. Due to the rotation of the screw 4, there is a double conveying and compressing process of the product; on the one hand, over the male threads 16 of the moving screw 4 regarding the fixed inner wall of the jacket 1, and on the other hand, over the rotating inner surface of the screw 4 relative to the stationary screw 7 and the threads 17.

Through the inlet pipe 10a, a coolant is introduced through bores 10 into the inner screw 7 and frictional heat, if any, is eliminated. If necessary, a heat supplying medium can be conducted through the bores 10, depending on the product to be processed.

Through the inlet pipe 11a a liquid dye can be introduced through bore or bore 11 provided in the inner screw 7 into the inner material current. The bores 11 open into the space between the threads 17 of the inner screw 7, substantially in the central region of the screw 7.

The preceding specific embodiment is illustrative of the practice of the invention. It is to be understood, however, that other expedients known to those skilled in the art, or disclosed herein may be employed without departing from the spirit of the invention or the scope of the appended claims.

We claim:

1. In an extruder provided with a hopper at one end and a restricted nozzle at the opposite end and two press screws arranged coaxially in one another within an outer jacket, each of said screws being provided with a male thread for feeding in the direction of said nozzle, said male threads extending into an outer annular space between said jacket and the outer press screw and extending into an inner annular space between said two press screws, means operatively connected to the outer press screw to rotate the outer press screw and means maintaining the inner of said two press screws stationary, said outer press screw being provided with window-like openings communicating with said inner press screw in the area of said hopper and separate feed means in said hopper to separately feed to the area between said outer jacket and said outer press screw and to the area between said outer press screw and said inner press screw through said window-like openings, the improvement consisting in that said threads on each of said screws are oppositely oriented and a mixing element is positioned between said nozzle and said press screws, said mixing element being an annular ring mounted on said outer press screw and having blade-type mixing tools extending into said outer annular space and blade-type mixing tools extending into said inner annular space with openings communicating between said mixing tools extending from said inner annular space to said outer annular space.

2. The extruder of claim 1 having means in said stationary inner press screw for cooling comprising bores adapted to be in communication with a coolant.

3. The extruder of claim 1 having means in said stationary inner press screw for introduction of a liquid comprising at least one bore being in communication with said inner annular space.

* * * * *